US010613937B2

(12) United States Patent
Kahler et al.

(10) Patent No.: US 10,613,937 B2
(45) Date of Patent: *Apr. 7, 2020

(54) CAPTURING COMPRESSION EFFICIENCY METRICS FOR PROCESSING DATA

(71) Applicant: INTERNATIONAL BUSINESS MACHINES CORPORATION, Armonk, NY (US)

(72) Inventors: David R. Kahler, Tucson, AZ (US); Kurt A. Lovrien, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/831,062

(22) Filed: Dec. 4, 2017

(65) Prior Publication Data

US 2018/0089030 A1  Mar. 29, 2018

Related U.S. Application Data

(63) Continuation of application No. 14/612,134, filed on Feb. 2, 2015, now Pat. No. 9,886,345.

(51) Int. Cl.
*G06F 11/00* (2006.01)
*G06F 11/10* (2006.01)

(52) U.S. Cl.
CPC .. *G06F 11/1096* (2013.01); *G06F 2211/1014* (2013.01); *G06F 2211/1088* (2013.01)

(58) Field of Classification Search
CPC ............. G06F 11/1096; G06F 11/3082; G06F 2211/1014; G06F 2211/1088
See application file for complete search history.

(56) References Cited

U.S. PATENT DOCUMENTS

| 6,145,069 | A | 11/2000 | Dye |
| 7,512,862 | B1 * | 3/2009 | Taylor ................. G06F 11/1076 702/189 |
| 8,407,191 | B1 | 3/2013 | Nanda |
| 8,473,778 | B2 | 6/2013 | Simitci et al. |
| 9,529,535 | B2 * | 12/2016 | Koseki ................. G06F 11/108 |
| 9,606,870 | B1 * | 3/2017 | Meiri ................... G06F 11/1092 |
| 9,886,345 | B2 * | 2/2018 | Kahler ................. G06F 11/1096 |

(Continued)

FOREIGN PATENT DOCUMENTS

CN 101271428 9/2008

OTHER PUBLICATIONS

U.S. Appl. No. 14/612,134, filed Feb. 2, 2015.
Office Action dated Aug. 4. 2016, pp. 13, for U.S. Appl. No. 14/612,134, filed Feb. 2, 2015.
Response dated Nov. 4, 2016, pp. 13, to Office Action dated Aug. 4, 2016, pp. 13, for U.S. Appl. No. 14/612,134, filed Feb. 2, 2015.
Final Office Action dated Jan. 30, 2017, pp. 11, for U.S. Appl. No. 14/612,134, filed Feb. 2, 2015.

(Continued)

*Primary Examiner* — Marc Duncan
*Assistant Examiner* — Jonathan D Gibson
(74) *Attorney, Agent, or Firm* — Janaki K. Davda; Konrad Raynes Davda & Victor LLP

(57) ABSTRACT

Provided are techniques for capturing compression efficiency metrics for processing data. In response to retrieving native data for a first operation, perform the first operation; perform a second operation to generate a compression efficiency metric from the native data based on a ratio of the native data to compressed native data; and store the compression efficiency metric persistently for subsequent use in prioritizing compression of the native data.

18 Claims, 6 Drawing Sheets

(56) References Cited

U.S. PATENT DOCUMENTS

| | | | |
|---|---|---|---|
| 10,037,245 B2* | 7/2018 | Gerhard | G06F 3/0619 |
| 2002/0191692 A1 | 12/2002 | Fallon et al. | |
| 2012/0059978 A1 | 3/2012 | Rosenband et al. | |
| 2013/0173956 A1* | 7/2013 | Anderson | G06F 11/1076 |
| | | | 714/6.24 |
| 2013/0198843 A1* | 8/2013 | Blount | G06F 11/1076 |
| | | | 726/24 |
| 2013/0198844 A1 | 8/2013 | Blount | |
| 2013/0246707 A1* | 9/2013 | Bourbonnais | G06F 11/1076 |
| | | | 711/114 |
| 2013/0275396 A1 | 10/2013 | Condict et al. | |
| 2015/0012506 A1 | 1/2015 | Bhagavan et al. | |
| 2015/0100721 A1* | 4/2015 | Koseki | G06F 11/108 |
| | | | 711/103 |
| 2016/0224424 A1 | 8/2016 | Kahler et al. | |
| 2017/0286220 A1* | 10/2017 | Gerhard | G06F 11/1076 |
| 2018/0089030 A1* | 3/2018 | Kahler | G06F 11/1096 |

OTHER PUBLICATIONS

Response dated Apr. 27, 2017, pp. 15, to Final Office Action dated Jan. 30, 2017, pp. 11, for U.S. Appl. No. 14/612,134, filed Feb. 2, 2015.

Office Action dated Jun. 16, 2017, pp. 12, for U.S. Appl. No. 14/612,134, filed Feb. 2, 2015.

Response dated Sep. 18, 2017, pp. 16, to Office Action dated Jun. 16, 2017, pp. 12, for U.S. Appl. No. 14/612,134, filed Feb. 2, 2015.

Notice of Allowance dated Sep. 29, 2017, pp. 9, for U.S. Appl. No. 14/612,134, filed Feb. 2, 2015.

List of IBM Patents or Patent Applications Treated as Related, dated Dec. 4, 2017, pp. 2.

Chinese Office Action dated Apr. 25, 2018, pp. 5, Application No. 20160068935.2.

English machine translation for CN 101271428, Sep. 24, 2008, pp. 8.

\* cited by examiner

US 10,613,937 B2

CAPTURING COMPRESSION EFFICIENCY METRICS FOR PROCESSING DATA

FIELD

Embodiments of the invention relate to capturing compression efficiency metrics for processing data.

BACKGROUND

A virtualized system may be described as one that provides a logical view of data to a host computer. That is, although the data may be physically stored on different storage devices, the virtualized system provides a view of the data to the host computer so that the host computer treats the data as being stored on one storage device. Then, when the data is to be stored or retrieved, the virtualized system maps the location of the data between the logical view and the physical storage.

Virtualized systems may have little visibility or control over the form that client data takes. For example, data from the host computer may be compressed, or encrypted, at higher layers in a stack. Another example is that certain classes of data may be compressible with different algorithms, or at different levels of efficiency. When virtualized systems store data, for efficiency purposes (such as reducing latency), compression attributes (such as how many zeroes are in the data) of data may be unknown or hard to assess against real time system requirements.

Redundant Array of Inexpensive Disk (RAID) storage adapters have a history of reading up persistent data for the purpose of periodically checking/verifying parity or redundancy of data. Additionally, the hardware/firmware engines in RAID storage adapters may have access to firmware or hardware compression engines.

The compression engines may compress and decompress data to be written to RAID storage and decompress data to be read from RAID storage.

SUMMARY

Provided is a computer program product for capturing compression efficiency metrics for processing data. The computer program product comprises a computer readable storage medium having program code embodied therewith, the program code executable by at least one processor to perform: periodically retrieving, by the at least one processor, native data of an extent from storage to perform a consistency scrub operation that verifies parity data to determine whether the native data is accurate and recoverable; and, in response to retrieving the native data of the extent for the consistency scrub operation, performing, by the at least one processor, the consistency scrub operation; and generating, by the at least one processor, a compression efficiency metric for the extent by: compressing the native data and generating a ratio of the native data to the compressed native data; and storing, by the at least one processor, the compression efficiency metric persistently for subsequent use in prioritizing compression of multiple extents.

Provided is a method for capturing efficiency metrics for processing data. The method comprises: periodically retrieving, with a processor of a computer, native data of an extent from storage to perform a consistency scrub operation that verifies parity data to determine whether the native data is accurate and recoverable; and, in response to retrieving the native data of the extent for the consistency scrub operation, performing the consistency scrub operation; and generating a compression efficiency metric for the extent by: compressing the native data and generating a ratio of the native data to the compressed native data; and storing the compression efficiency metric persistently for subsequent use in prioritizing compression of multiple extents.

Provided is a computer system for capturing efficiency metrics for processing data. The computer system comprises: one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations, the operations comprising: periodically retrieving native data of an extent from storage to perform a consistency scrub operation that verifies parity data to determine whether the native data is accurate and recoverable; and, in response to retrieving the native data of the extent for the consistency scrub operation, performing the consistency scrub operation; and generating a compression efficiency metric for the extent by: compressing the native data and generating a ratio of the native data to the compressed native data; and storing the compression efficiency metric persistently for subsequent use in prioritizing compression of multiple extents.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
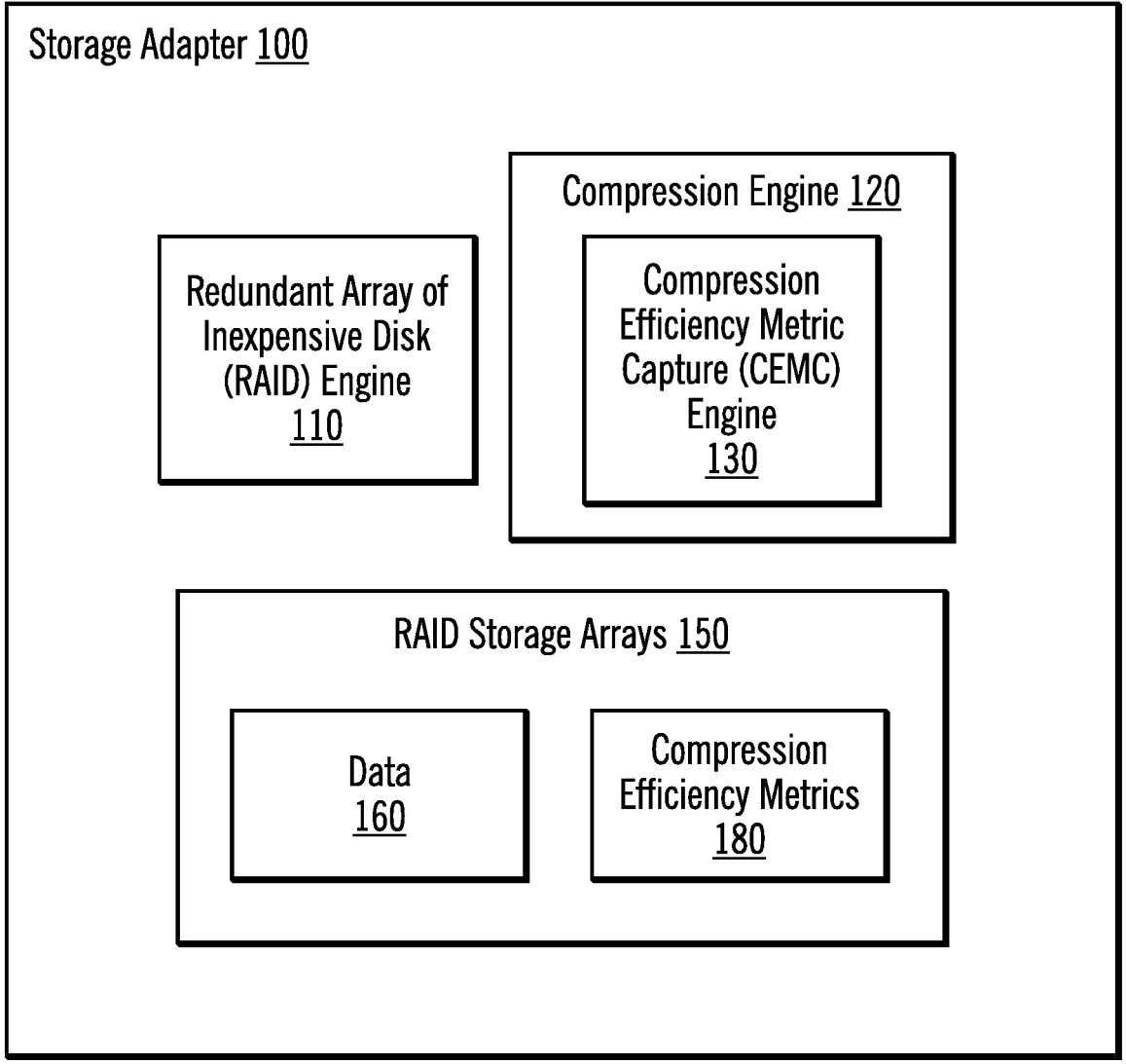
FIG. 1 illustrates, in a block diagram, a computing environment in accordance with certain embodiments.

FIG. 1 illustrates, in a block diagram, a computing environment in accordance with certain embodiments. A storage adapter 100 includes a Redundant Array of Inexpensive Disk (RAID) engine 110, a compression engine 120, and RAID storage arrays 150. The compression engine 120 includes Compression Efficiency Metric Capture (CEMC) engine 130. The RAID storage arrays 150 store data 160 and compression efficiency metrics 180. Certain embodiments integrate RAID consistency or RAID data redundancy techniques that are already reading/transferring data with the compression engine processing so that compression efficiency metrics regarding the data may be captured and persistently stored for harvesting later to efficiently compress virtualized data. That is, certain embodiments relate to capturing compression viability (e.g., compression efficiency metrics) when retrieving data for a RAID consistency scrub operation (e.g., a parity/redundancy check).

The RAID engine 110 performs an operation that retrieves data 160 from the RAID storage arrays 150. The retrieved data may be referred to as native data. Native data may be described as data in the format in which it is stored at the time the native data is retrieved. In certain embodiments, the native data is uncompressed data. In other embodiments, the native data is compressed data, which may be compressed again. Also, in various embodiments, the native data may be unencrypted data (e.g., clear text) or encrypted data.

In certain embodiments, the RAID engine 110 reads the data 160 for the purpose of periodically checking/verifying parity or redundancy of the data 160. The data retrieval engine 110 provides access to the data 160 to the CEMC engine 120. In certain embodiments, the RAID engine 110 forwards a copy of the data 160 to the CEMC engine 120. In certain embodiments, the RAID engine 110 stores the data 160 in a location that may be accessed by the CEMC engine 120. The CEMC engine 120 processes the data 160 to generate the compression efficiency metrics 180 that indicate a ratio of how efficient compression for the data 160 is and stores the compression efficiency metrics 180 persistently.

In certain embodiments, the RAID engine 110 and the compression engine 120 occupy a same virtualization layer in a virtualization hierarchy. The virtualization hierarchy may be described as a functional stack (made of virtualization layers) that is used to map host data to underlying physical storage or to a lower virtualization layer in the functional stack. This may take many forms, but the concept is that RAID engine 110 in a storage hierarchy has access to a firmware or hardware compression engine 120. The RAID engine 110 has background tasks that verify parity/redundancy data by reading data from underlying storage devices primarily for applying RAID techniques and checking that stored data is accurate (i.e., without errors) and recoverable (e.g., even when there is a problem with the data, the data may be corrected). The RAID techniques involve reading up 'clear text' data on a periodic basis. To meet the RAID consistency scrub requirement, the RAID engine 110 accesses large amounts of data on a regular pace (e.g., guaranteeing that all data in a given domain has redundancy checked on a periodic basis).

With embodiments, the compression engine 120 also processes the data that the RAID engine 110 retrieved for a RAID consistency scrub operation. The compression engine 120 processes the data to derive compression efficiency metrics 180 and stores the compression efficiency metrics 180 back into metadata areas in storage arrays. At a later time, tasks in virtualization hierarchies may harvest the stored compression efficiency metrics 180 for data quickly, and use the compression efficiency metrics 180 to intelligently manage large storage virtualized data to achieve both capacity and access efficiency for virtualized data.

A storage tier may be described as a set of storage having different types of performance characteristics (e.g., some storage may have faster access than other storage). For example, storage tiering applications may read metadata attributes for virtualized extents and may migrate and compress data known to have specific compression efficiency to achieve overall storage efficiency from storage having one type of performance characteristics to storage having another type of performance characteristics.

Figure 2:
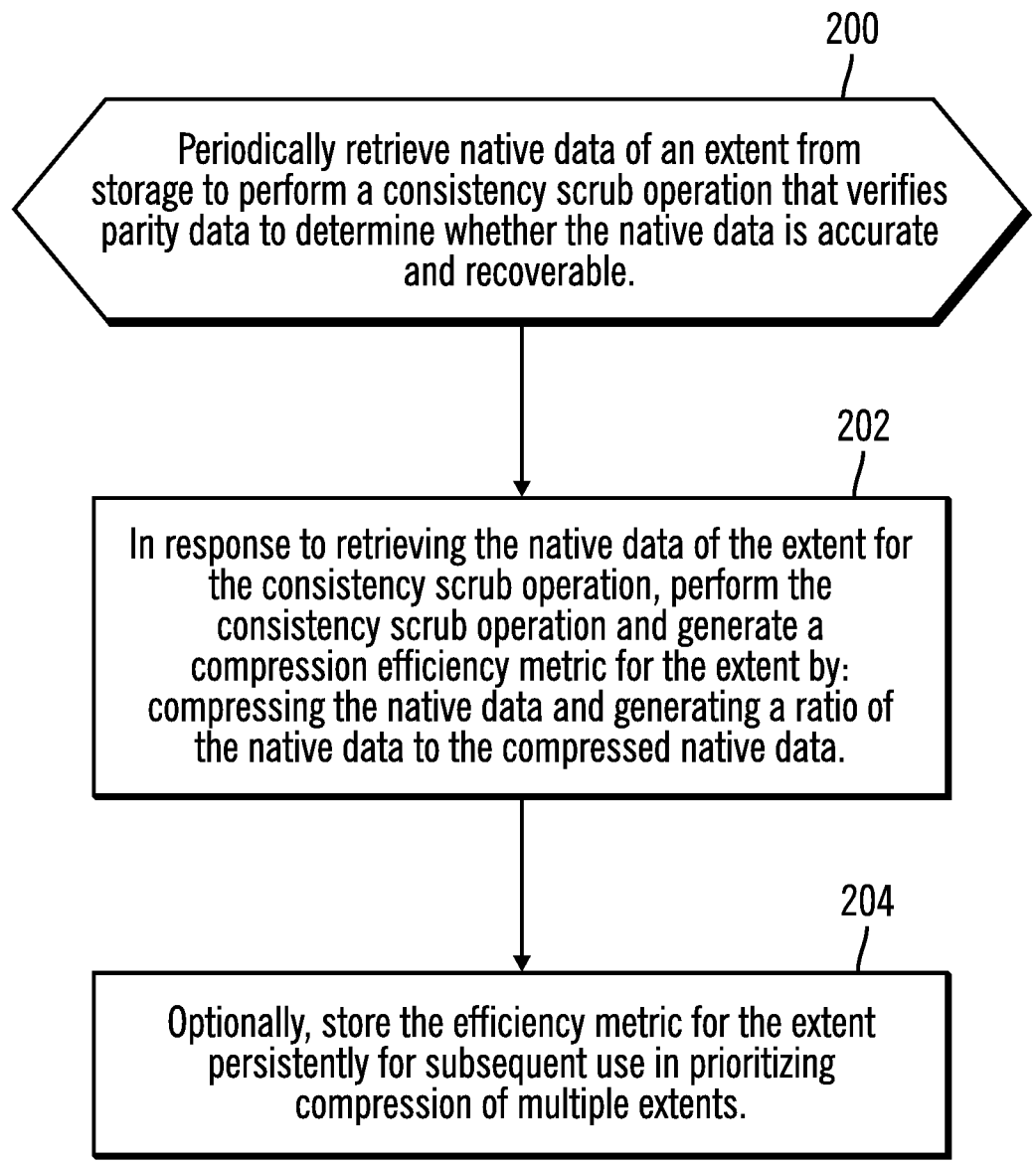
FIG. 2 illustrates, in a flow diagram, operations for generating compression efficiency metrics in accordance with certain embodiments.

FIG. 2 illustrates, in a flow diagram, operations for generating compression efficiency metrics in accordance with certain embodiments. Control begins at block 200 with the RAID engine 110 retrieving native data of an extent from storage (e.g., the RAID storage arrays 150) for a consistency scrub operation (e.g., a redundancy or parity check). An extent may be described as a contiguous region of computer storage (e.g., a portion of the RAID storage arrays 150). The RAID engine 110 provides access, to the retrieved, native data, to the CEMC engine 120 for use in generating a compression efficiency metric. In block 202, in response to retrieving the native data of the extent for the consistency scrub operation, the RAID engine 110 performs the consistency scrub operation, and the CEMC engine 120 generates a compression efficiency metric for the extent by: compressing the native data and generating a ratio of the native data to the compressed native data. With embodiments, the native data that is retrieved for the consistency scrub operation is also used for the compression operation (without having to retrieve the native data a second time). In block 204, the CEMC engine 102 optionally stores the efficiency metric for the extent persistently for subsequent (future) use in prioritizing compression of multiple extents. If the compression efficiency metric indicates that the native data did not compress well, in certain embodiments, the compression efficiency metric is not stored persistently, while, in other embodiments the compression efficiency metric is still stored.

Figure 3:
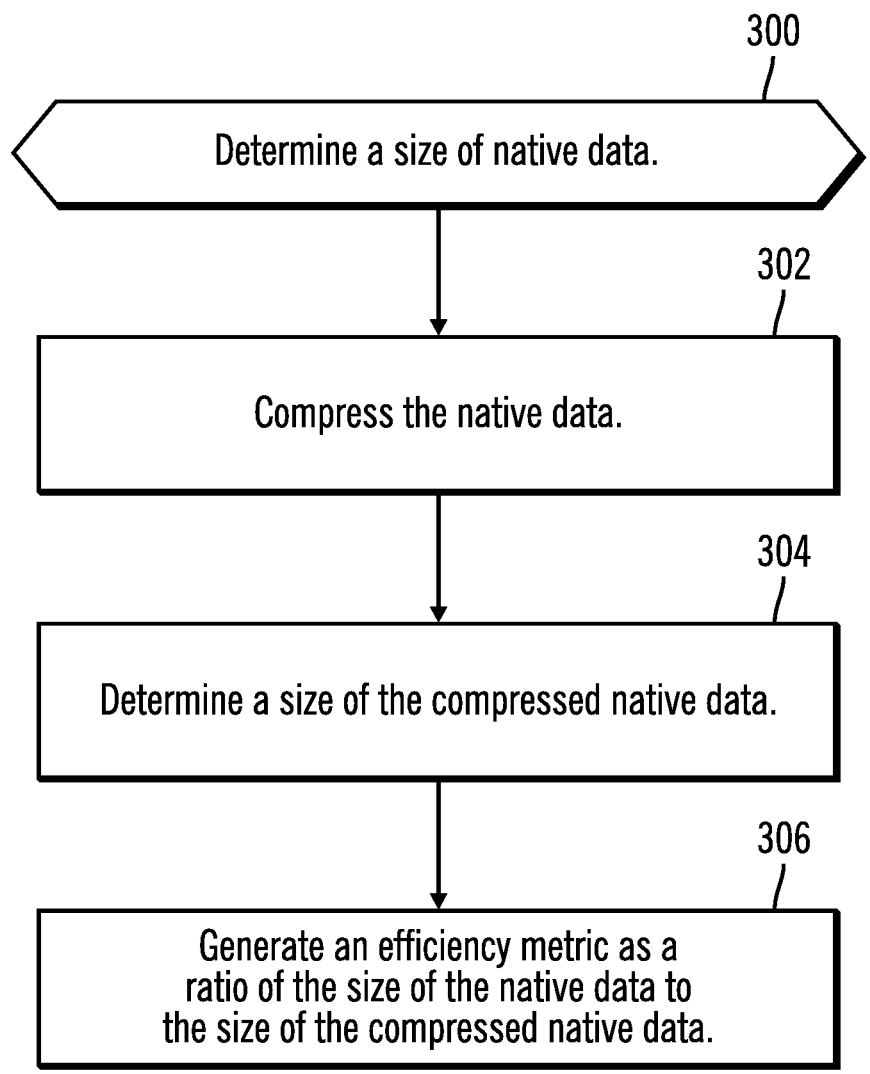
FIG. 3 illustrates, in a flow diagram, operations for generation of a compression efficiency metric in accordance with certain embodiments.

FIG. 3 illustrates, in a flow diagram, operations for generation of a compression efficiency metric in accordance with certain embodiments. Control begins at block 300 with the CEMC engine 120 determining a size of native data. In block 302, the CEMC engine 120 compresses the native data. In block 304, the CEMC engine 120 determines a size of the compressed native data. In block 306, the CEMC engine 120 generates a compression efficiency metric as a ratio of the size of the native data to the size of the compressed native data. For example, if the size of native data is 10 megabytes, and the size of the compressed data is 2 megabytes, then the compression efficiency metric is the ratio of 5 to 1.

Figure 4:
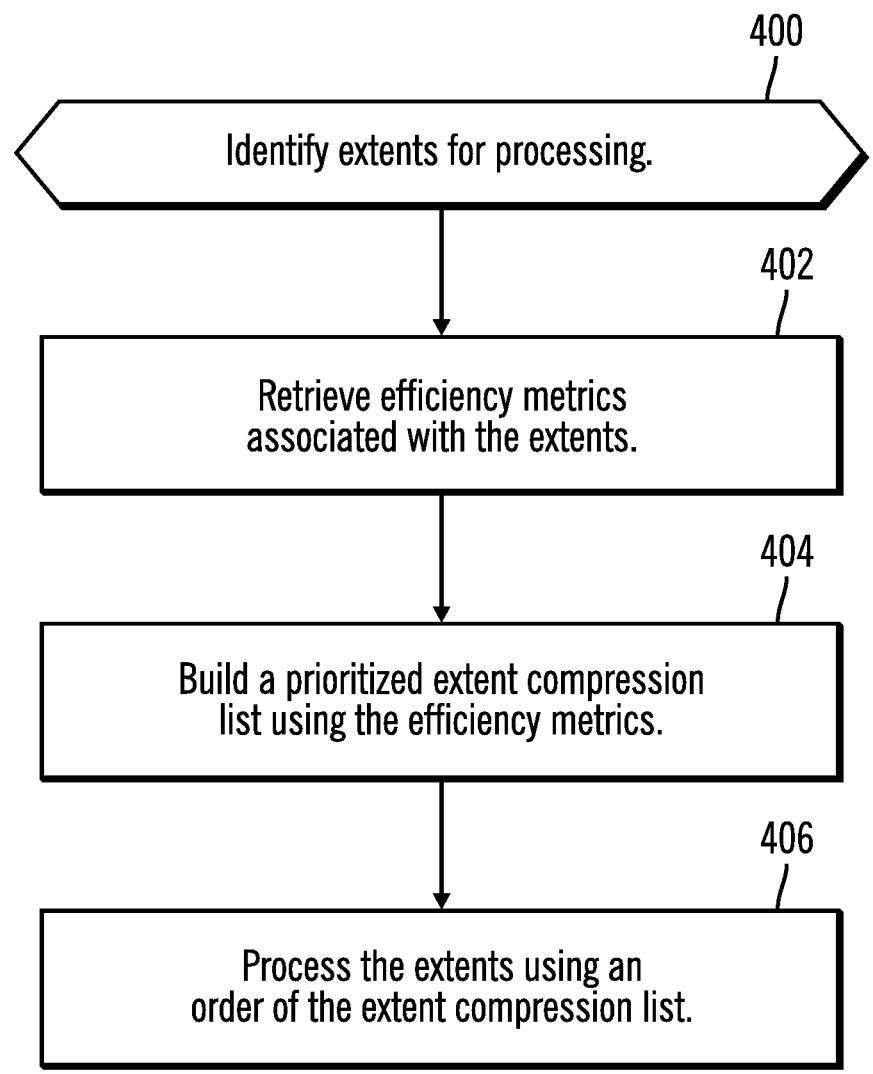
FIG. 4 illustrates, in a flow diagram, operations for using compression efficiency metrics according to certain embodiments.

FIG. 4 illustrates, in a flow diagram, operations for using compression efficiency metrics according to certain embodiments. Control begins at block 400 with the CEMC engine 120 identifying extents for processing. In certain embodiments, each of the extents may be described as a contiguous region of computer storage (e.g., a portion of the RAID storage arrays 150). In block 402, the CEMC engine 120 retrieves compression efficiency metrics associated with the extents. In block 404, the CEMC engine 120 builds a prioritized extent compression list using the compression efficiency metrics. In certain embodiments, the extents are ordered from extents having higher compression efficiency metrics (higher ratios) to lower compression efficiency metrics (lower ratios). In block 406, the CEMC engine 120 processes the extents using an order of the extent compression list (e.g., extents having higher compression efficiency metrics (higher ratios) are processed first. The processing of block 406 may be one or more of: copying, compressing, and moving the extents.

Merely to enhance understanding, an example is given herein using a system consisting of RAID storage arrays, a RAID engine, a compression engine including the CEMC engine, a storage tiering application, and a virtualization metadata scheme in which compression efficiency metrics for data are stored. With such an example system, RAID storage arrays consisting of multiple storage devices are coupled to a RAID engine, which may use or have access to a compression engine, and which may be part of a virtualized storage hierarchy.

A RAID consistency check may utilize the compression engine as an additional background task as data is passed through for redundancy check. Assume for this example that the data is arranged so that the extents of data for RAID consistency are smaller and sequential relative to the extents of data in a virtualization model. For example, assume 256K byte extents in RAID redundancy model, where a two megabyte virtualization extent is comprised of eight raid extents.

With such an example system, compression viability is recorded as follows:

1) Read component data for the RAID extent
2) Apply RAID technique and verify RAID consistency
3) On the RAID data, pass the data through to the compression engine, which calculates a compression efficiency metric reflecting a ratio.
4) Repeat operations 1-3 on the set of RAID extents until a compression metric for a virtualization extent is known. In this example, since eight RAID extents comprise one virtualization extent, the compression engine calculates a compression efficiency metric for each of the eight RAID extents and takes an average of these eight compression efficiency metrics to obtain a compression efficiency metric that is associate with the virtualization extent.
5) Record metadata for the virtualization extent reflecting the compression efficiency metric for that virtualization extent.

During a compression evaluation phase, the compression efficiency metrics are read for virtualization extents, a prioritized extent compression list is built using the compression efficiency metrics, and a storage tiering model is applied to copy/compress/move the virtualized extents to compressed form.

In certain embodiments, existing consistency scrub operations read data from RAID storage arrays, looking for media errors or looking for data inconsistencies (e.g., such as that a calculated parity does not match parity on the disk). These consistency scrub operations scrub all of the data on the array, a portion at a time, on a periodic basis. With embodiments, data compression may use the consistency scrub operations to obtain compression efficiency metrics (and store those compression efficiency metrics) on how compressible the data is, allowing, for example, the user to make a better choice as to whether or not to enable compression. That is, as long as the consistency scrub operation has to read all the data anyway, the data may as well be run through a compression engine (but not stored) to calculate the compression efficiency metrics about how well the data compressed. In certain embodiments, the consistency scrub operation is a background operation.

Figure 5:
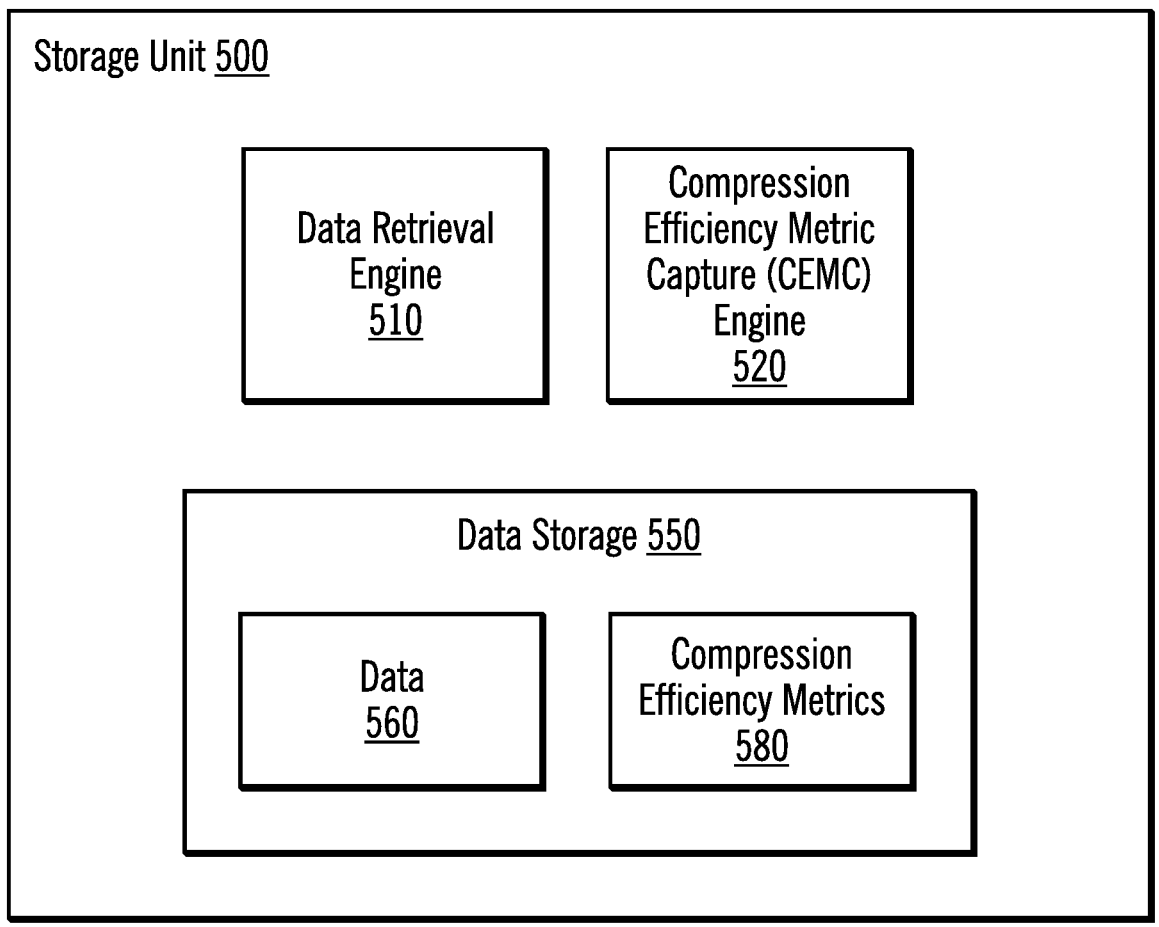
FIG. 5 illustrates, in a block diagram, another computing environment in accordance with certain embodiments.

FIG. 5 illustrates, in a block diagram, another computing environment in accordance with certain embodiments. A storage unit 500 (e.g., a storage controller, a storage adapter, a server computer or other computing device) includes a data retrieval engine 510, a Compression Efficiency Metric Capture (CEMC) engine 520 (which may be part of or separate from a compression engine), and data storage 150.

The data storage 550 stores data 560 and stores compression efficiency metrics 580 persistently. In certain embodiments, the data storage 550 is a set of RAID storage arrays. The data retrieval engine 510 performs an operation that retrieves data 560 from the data storage 550. The retrieved data may be referred to as native data. Native data may be described as data in the format in which it is stored at the time the native data is retrieved. In certain embodiments, the native data is uncompressed data. In other embodiments, the native data is compressed data, which may be compressed again. Also, in various embodiments, the native data may be unencrypted data (e.g., clear text) or encrypted data. In certain embodiments, the data retrieval engine 510 is a RAID engine 110 that reads the data 560 for the purpose of periodically checking/verifying parity or redundancy of the data 560. The data retrieval engine 510 provides access to the data 560 to the CEMC engine 520. In certain embodiments, the data retrieval engine 510 forwards a copy of the data 560 to the CEMC engine 520. In certain embodiments, the data retrieval engine 510 stores the data 560 in a location that may be accessed by the CEMC engine 520. In certain embodiments, the CEMC engine 520 is a compression engine. The CEMC engine 520 processes the data 560 to generate the compression efficiency metrics that indicate a ratio of how efficient compression for the data 560 is and stores the compression efficiency metrics 580 persistently.

With embodiments, the data retrieval engine 510 performs the operations performed by the RAID engine 110, and the CEMC engine 520 performs the operations performed by the CEMC engine 120 with reference to FIGS. 2, 3, and 4.

Figure 6:
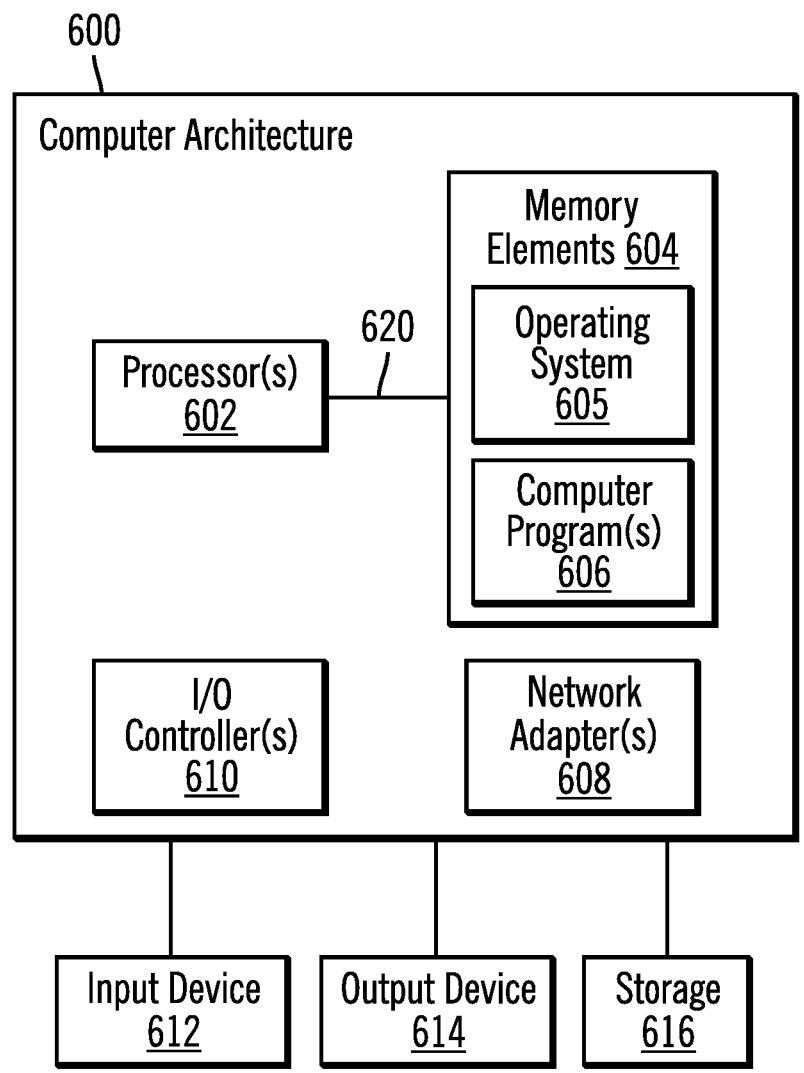
FIG. 6 illustrates, in a block diagram, a computer architecture that may be used in accordance with certain embodiments.

FIG. 6 illustrates a computer architecture 600 that may be used in accordance with certain embodiments. In certain embodiments, the storage adapter 100 and/or the storage unit 500 may implement computer architecture 600. The computer architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The computer architecture 600 may be coupled to storage 616 (e.g., any type of storage device; a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The computer architecture 600 may include fewer components than illustrated, additional components not illustrated herein, or some combination of the components illustrated and additional components. The computer architecture 600 may comprise any computing device known in the art, such as a mainframe, server, personal computer, workstation, laptop, handheld computer, telephony device, network appliance, virtualization device, storage controller, etc.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program code embodied therewith, the program code executable by at least one processor to perform:
   for each physical extent of multiple physical extents of a first virtualized extent and for each physical extent of multiple physical extents of a second virtualized extent,
      periodically retrieving, by the at least one processor, with a Redundant Array of Inexpensive Disk (RAID) engine, native data of that physical extent from storage to perform a consistency scrub operation that verifies parity data to determine whether the native data is accurate and recoverable;
      providing, by the at least one processor, with the RAID engine, the native data to a Compression Efficiency Metric Capture (CEMC) engine;
      performing, by the at least one processor, with the RAID engine, the consistency scrub operation for the physical extent; and
      generating, by the at least one processor, with the CEMC engine, a compression efficiency metric for the physical extent;
   calculating, by the at least one processor, with the CEMC engine, for the first virtualized extent, a first average compression efficiency metric by taking an average of compression efficiency metrics of the multiple physical extents for the first virtualized extent;
   calculating, by the at least one processor, with the CEMC engine, for the second virtualized extent, a second average compression efficiency metric by taking an average of compression efficiency metrics of the multiple physical extents for the second virtualized extent; and
   compressing, by the at least one processor, with the CEMC engine, the multiple physical extents of the first virtualized extent and the multiple physical extents of the second virtualized extent according to an ordering based on the first average compression efficiency metric and the second average compression efficiency metric.

2. The computer program product of claim 1, wherein the program code is executable by the at least one processor to perform:
   determining a size of the native data;
   determining a size of compressed native data; and
   generating the compression efficiency metric as a ratio of the size of the native data to the size of the compressed native data.

3. The computer program product of claim 1, wherein the program code is executable by the at least one processor to perform:
   performing any of copying and moving the multiple physical extents of the first virtualized extent and the multiple physical extents of the second virtualized extent according to the ordering.

4. The computer program product of claim 1, wherein the program code is executable by the at least one processor to perform:
   storing the first average compression efficiency metric and the second average compression efficiency metric.

5. The computer program product of claim 1, wherein the storage is a Redundant Array of Inexpensive Disk (RAID) storage array, and wherein the native data is unencrypted data.

6. The computer program product of claim 1, wherein the compression efficiency metric for a particular physical extent is not stored in response to determining that the compression efficiency metric indicates that the native data did not compress well.

7. A method, comprising:
   for each physical extent of multiple physical extents of a first virtualized extent and for each physical extent of multiple physical extents of a second virtualized extent,
      periodically retrieving with a Redundant Array of Inexpensive Disk (RAID) engine, native data of that physical extent from storage to perform a consistency scrub operation that verifies parity data to determine whether the native data is accurate and recoverable;
      providing, with the RAID engine, the native data to a Compression Efficiency Metric Capture (CEMC) engine;
      performing with the RAID engine, the consistency scrub operation for the physical extent; and
      generating with the CEMC engine, a compression efficiency metric for the physical extent;
   calculating with the CEMC engine, for the first virtualized extent, a first average compression efficiency metric by taking an average of compression efficiency metrics of the multiple physical extents for the first virtualized extent;
   calculating with the CEMC engine, for the second virtualized extent, a second average compression efficiency metric by taking an average of compression efficiency metrics of the multiple physical extents for the second virtualized extent; and
   compressing with the CEMC engine, the multiple physical extents of the first virtualized extent and the multiple physical extents of the second virtualized extent according to an ordering based on the first average compression efficiency metric and the second average compression efficiency metric.

8. The method of claim 7, further comprising:
   determining a size of the native data;
   determining a size of compressed native data; and
   generating the compression efficiency metric as a ratio of the size of the native data to the size of the compressed native data.

9. The method of claim 7, further comprising:
   performing any of copying and moving the multiple physical extents of the first virtualized extent and the multiple physical extents of the second virtualized extent according to the ordering.

10. The method of claim 7, further comprising:
    storing the first average compression efficiency metric and the second average compression efficiency metric.

11. The method of claim 7, wherein the storage is a Redundant Array of Inexpensive Disk (RAID) storage array, and wherein the native data is unencrypted data.

12. The method of claim 7, wherein the compression efficiency metric for a particular physical extent is not stored in response to determining that the compression efficiency metric indicates that the native data did not compress well.

13. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more memories, to perform operations, the operations comprising:

for each physical extent of multiple physical extents of a first virtualized extent and for each physical extent of multiple physical extents of a second virtualized extent,
- periodically retrieving with a Redundant Array of Inexpensive Disk (RAID) engine, native data of that physical extent from storage to perform a consistency scrub operation that verifies parity data to determine whether the native data is accurate and recoverable;
- providing, with the RAID engine, the native data to a Compression Efficiency Metric Capture (CEMC) engine;
- performing with the RAID engine, the consistency scrub operation for the physical extent; and
- generating with the CEMC engine, a compression efficiency metric for the physical extent;

calculating with the CEMC engine, for the first virtualized extent, a first average compression efficiency metric by taking an average of compression efficiency metrics of the multiple physical extents for the first virtualized extent;

calculating with the CEMC engine, for the second virtualized extent, a second average compression efficiency metric by taking an average of compression efficiency metrics of the multiple physical extents for the second virtualized extent; and compressing with the CEMC engine, the multiple physical extents of the first virtualized extent and the multiple physical extents of the second virtualized extent according to an ordering based on the first average compression efficiency metric and the second average compression efficiency metric.

14. The computer system of claim 13, wherein the operations further comprise:
- determining a size of the native data;
- determining a size of compressed native data; and
- generating the compression efficiency metric as a ratio of the size of the native data to the size of the compressed native data.

15. The computer system of claim 13, wherein the operations further comprise:
- performing any of copying and moving the multiple physical extents of the first virtualized extent and the multiple physical extents of the second virtualized extent according to the ordering.

16. The computer system of claim 13, wherein the operations further comprise:
- storing the first average compression efficiency metric and the second average compression efficiency metric.

17. The computer system of claim 13, storage is a Redundant Array of Inexpensive Disk (RAID) storage array, and wherein the native data is unencrypted data.

18. The computer system of claim 13, wherein the compression efficiency metric for a particular physical extent is not stored in response to determining that the compression efficiency metric indicates that the native data did not compress well.

* * * * *